(12) United States Patent
Morris

(10) Patent No.: US 8,747,197 B2
(45) Date of Patent: Jun. 10, 2014

(54) HANDHELD ELECTRONIC DEVICE FOR ENTERING ACTIVITY OF SPORTING EVENT BY MULTIPLE PARTIES HAVING PARTY SCORES

(76) Inventor: Bradley Morris, Palm Coast, FL (US)

( * ) Notice: Subject to any disclaimer, the term of this patent is extended or adjusted under 35 U.S.C. 154(b) by 0 days.

(21) Appl. No.: 13/467,104

(22) Filed: May 9, 2012

(65) Prior Publication Data

US 2013/0303246 A1 Nov. 14, 2013

(51) Int. Cl.
*A63B 71/06* (2006.01)

(52) U.S. Cl.
USPC ............ 463/4; 463/1; 463/2; 463/3; 473/569; 473/570; 473/571; 235/1 B

(58) Field of Classification Search
USPC .................... 473/569–572; 463/1–4
See application file for complete search history.

(56) References Cited

U.S. PATENT DOCUMENTS

| | | | | |
|---|---|---|---|---|
| 3,396,247 | A | * | 8/1968 | Rankin .......................... 200/5 B |
| 4,082,278 | A | | 4/1978 | Bolton |
| 4,162,792 | A | | 7/1979 | Chang et al. |
| 4,220,992 | A | | 9/1980 | Blood et al. |
| 4,249,734 | A | | 2/1981 | Bromley |
| 4,249,735 | A | | 2/1981 | Bromley |
| 4,322,074 | A | | 3/1982 | James et al. |
| 4,758,692 | A | * | 7/1988 | Roeser et al. ................. 200/6 A |
| 5,026,058 | A | | 6/1991 | Bromley |
| 5,186,458 | A | | 2/1993 | Redondo |
| 5,288,069 | A | | 2/1994 | Matsumoto |
| 5,377,982 | A | | 1/1995 | Villarreal, Jr. |
| 5,445,375 | A | * | 8/1995 | Sweeny ......................... 473/570 |
| 5,730,443 | A | | 3/1998 | Allen |
| D439,620 | S | | 3/2001 | Podd et al. |
| 6,362,851 | B1 | * | 3/2002 | Lavelle et al. ............ 348/333.01 |
| 6,582,330 | B1 | | 6/2003 | Rehkemper et al. |
| 7,985,137 | B1 | * | 7/2011 | Klitsner et al. .................. 463/38 |
| 2003/0109339 | A1 | * | 6/2003 | Oister et al. .................... 473/570 |
| 2006/0183577 | A1 | | 8/2006 | DuFlon et al. |
| 2007/0281787 | A1 | * | 12/2007 | Numata et al. .................. 463/36 |
| 2008/0234077 | A1 | | 9/2008 | Glowinski |
| 2009/0289103 | A1 | | 11/2009 | Daicos |
| 2011/0214616 | A1 | * | 9/2011 | Levin et al. .................... 119/707 |
| 2012/0157246 | A1 | * | 6/2012 | Glover et al. ................... 473/570 |

FOREIGN PATENT DOCUMENTS

| | | |
|---|---|---|
| GB | 2314779 | 1/1998 |
| WO | 2007096569 | 8/2007 |

OTHER PUBLICATIONS

ESPN Handheld Football Game, Amazon.com web page printout dated Apr. 13, 2010.
Mattel Football I, handheldmusseum.com web page printout dated Apr. 13, 2010.
Superbown XLIV Special: Best 22 Football Gadget for NFL Fans; walyou.com web page printout dated Apr. 13, 2010.

* cited by examiner

*Primary Examiner* — Ronald Laneau
*Assistant Examiner* — Justin Myhr
(74) *Attorney, Agent, or Firm* — Shannon V. McCue; Hahn Loeser & Parks LLP

(57) ABSTRACT

According to the present invention, an electronic handheld device is provided for receiving information related to a broadcasted sporting contest, and calculating a score based upon the received information. The information is entered into the electronic handheld device via a controller having plurality of buttons, each button having an associated score. The controller includes a display for displaying team information, which may include the team name and the score for each team. The controller further includes circuit board having circuitry operatively connected to the controller for processing the entered information and outputting the processed information to the controller display.

17 Claims, 6 Drawing Sheets

HANDHELD ELECTRONIC DEVICE FOR ENTERING ACTIVITY OF SPORTING EVENT BY MULTIPLE PARTIES HAVING PARTY SCORES

TECHNICAL FIELD

Certain embodiments of the present invention relate to handheld electronic devices. More particularly, certain embodiments of the present invention relate to a handheld electronic sporting device passed between participants and a system for calculating a score for each participant based on scoring activities occurring within a corresponding game viewed by the participants. Most particularly, certain embodiments of the present invention relate to a handheld electronic sporting device incorporated in a football shaped housing and designed to calculate a score for each game participant based on scoring occurring within an American football game viewed by the participants.

BACKGROUND

Fan involvement in sporting games has increased over the years. With the introduction of fantasy sports, e.g., fantasy football, more fans are watching more games with no interest in the outcome of the game, but instead, to keep track of their player's progress. Previous electronic devices are not concerned with current in-game statistics, but instead, are more concerned with the game players progress through the game provided by the electronic device. For example, Play Station's® PSP® device has a game called Madden Football®, where access to broadcasted live scores are provided over a network on the provided screen. However, scoring in the actual Madden game itself is determined by the player's actions within the game, whether a touchdown is scored or not, and not based on the broadcasted scores. While fan involvement in broadcasted games has evolved over time, the electronic devices remain more concerned with games provided for the device than the events occurring during the broadcasted sporting contest related to the provided game. Therefore, a need exists to provide an electronic device that keeps fans involved in the live football action, while providing an electronic platform for competing with other fans.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

The present invention generally provides an electronic sporting device that is passed between participating players while watching a sporting event, the device including a controller; the controller having a first circuit board having at least one control operable by the players to transmit a command related to the sporting event, a first microprocessor in communication with the first circuit board and operatively connected to the control and a memory for receiving and processing the command, wherein the microprocessor is configured to transmit a dataset from the memory representative of the command; a display operatively connected to the first circuit board for displaying the transmitted dataset; a power source operatively connected to the microprocessor and the first circuit board; a device housing, wherein the controller, display, and power source are mounted within the device housing, wherein the display is located near an outer surface of the device housing and an opening is formed within the device housing to permit viewing of the display; and where the outer surface of the device housing defines a shape that facilitates passing of the device between players and the device housing includes a cushioning material surrounding at least a portion of the controller.

An embodiment of the present invention comprises an electronic sporting device that is passed between participating players. The electronic sporting device includes a device housing with an outer surface made from either a leather, foam, plush or synthetic material, or other soft material. The device housing also includes a void configured to receive a controller therein. The sporting device also includes a frame selectively secured within the void of the device housing. The frame includes an upper and lower portion, and an opening for receiving a controller therein.

The sporting device also includes a controller selectively secured to the upper portion of the frame. The controller includes a control panel with one or more apertures adapted to receive one or more controls therebetween. The controller also includes a circuit board having one or more controls selectively secured thereon. The one or more controls are configured to transmit a command upon being selected by a participating player, with the command being related to a broadcasted sporting contest. The circuit board also includes a microprocessor selectively secured thereon and operatively connected to the one or more controls and a memory for receiving and processing the commands. The microprocessor further transmits a dataset from the memory, the dataset being representative of the command.

The controller further includes a display selectively secured to the circuit board. The controller being adapted to display a calculated score processed by the microprocessor and based upon the transmitted dataset. The sporting device further includes a power source removably secured within the lower portion of the frame. The power source being operatively connected to the microprocessor and circuit board for providing power to the electronic sporting device.

In yet a further embodiment of the present invention, a method for playing a game between plural players using an electronic sporting device in conjunction with a sporting event viewed by the players is provided. The method includes the steps of providing an electronic sporting device having a controller having at least one control operable by the player during the sporting event. The method further includes the step of each player holding the sporting device for a predetermined time and selecting at least one control if a scoring event occurs in the sporting event during the predetermined time. The method also includes the step of the controller recording a point value associated with operation of the at least one control in a memory within the sporting device and calculating a score for each player. The method further includes the step of storing the score for each player in the memory and displaying the score on a display within the sporting device. Additionally, the method includes the step of tossing the electronic sporting device to another participant after the predetermined time, and repeating the above steps until the game is concluded.

These and other advantages and novel features of the present invention, as well as details of illustrated embodiments thereof, will be more fully understood from the following description and drawings.

DETAILED DESCRIPTION

Figure 1:
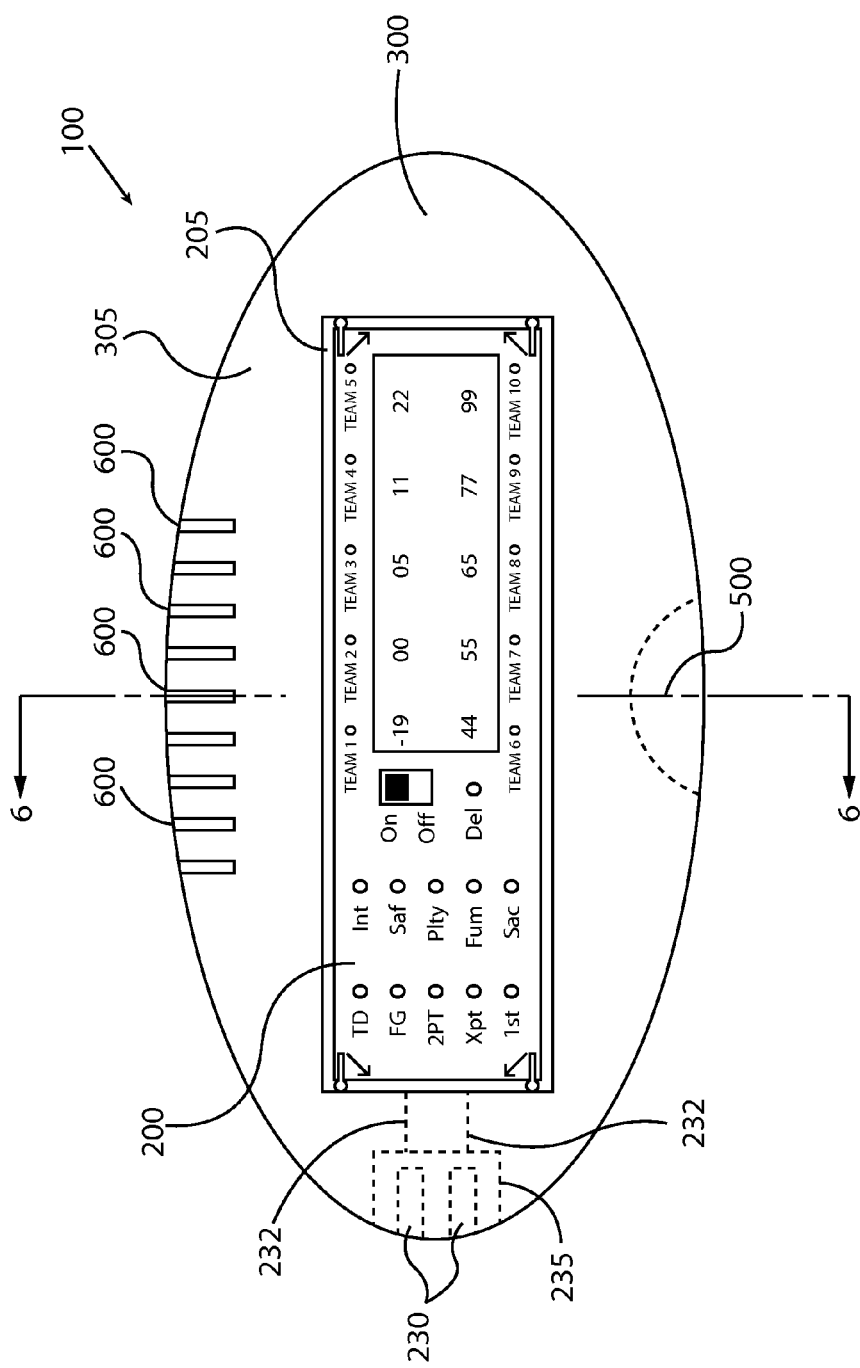
FIG. 1 illustrates a schematic front view of an embodiment of an electronic handheld device for receiving and calculating information related to a live event according to an embodiment of the present invention.

FIG. 1 illustrates a schematic front view of an embodiment of an electronic handheld device 100 for receiving and calculating information related to a live event according to an embodiment of the present invention.

In general, the device 100 includes a controller 200 and a device housing 300. The device housing 300 is configured to receive the controller 200, and may be shaped to correspond to an apparatus associated with an event or sporting contest (e.g., a helmet, a ball, traditional equipment etc.), or an electronic device (e.g., cell phone, tablet etc.). In one embodiment, the device housing 300 shape may be generally ovate or football-shaped. The controller 200 may include a control panel 205 that carries a display and one or more controls described more completely below. The control panel 205 may be near the outer surface 305 of the device housing 300 to facilitate access to the controls 215 and viewing of the display 210. The control panel 205 may be recessed from the outer surface 305 to prevent inadvertent operation of the controls 215 and to protect the display 210. Additionally, the control panel 205 may be flush with the outer surface 305, or the device housing 300.

Figure 5:
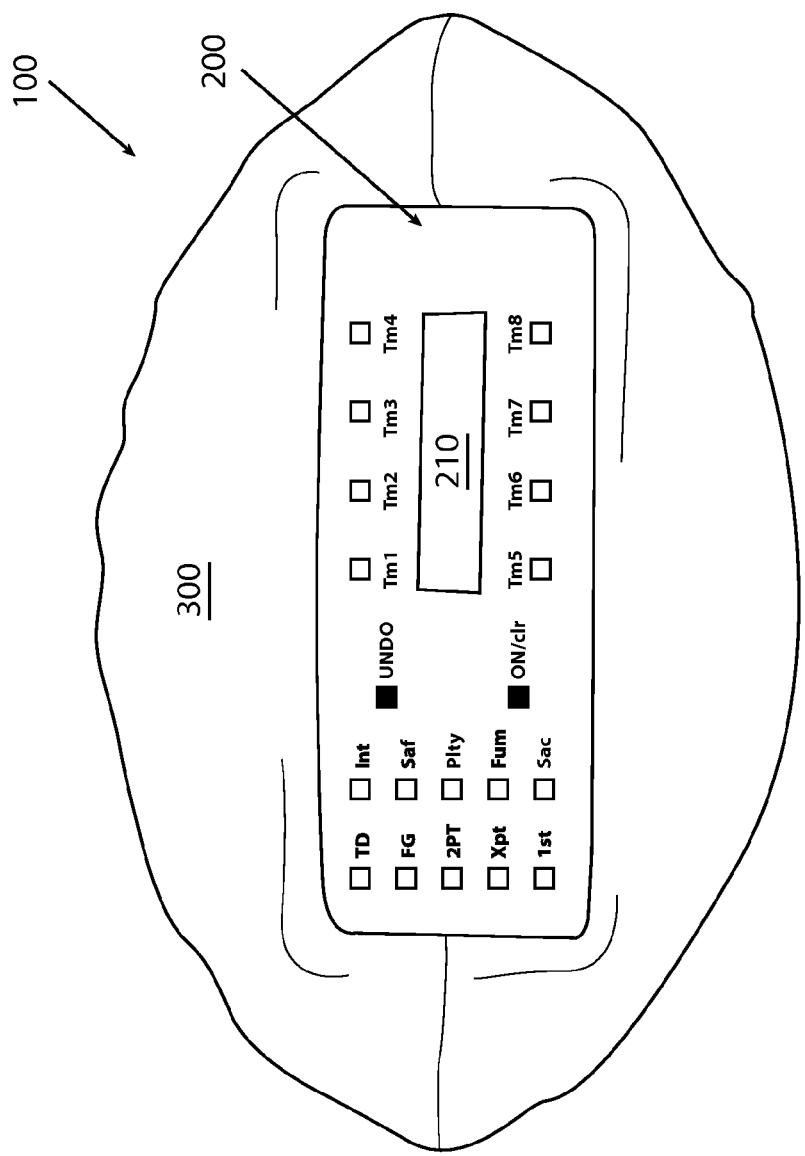
FIG. 5 illustrates a front view of an a handheld electric device having a football shaped housing according to an embodiment of the present invention.

The device housing 300, shown in FIG. 1, has the shape of a football that is indicative of the device 100 being used during a football game. Additionally, as illustrated in FIG. 5, the device housing 300 may have a similar depth to that of a professional American football used during the sporting contest. In order to provide the device 100 with similarities to the professional American football, the device housing 300 may be constructed with similar materials to that of the professional American football, for example, a leather or synthetic cover, or outer surface 305 overlying cushioning material 310, such as an air filled bladder, foam, cotton, or other soft materials known to persons of ordinary skill in the art. In an embodiment where the sporting contest is a collegiate game, the device housing 300 may have similarities to a collegiate game ball, being made from similar materials to the collegiate game ball. Other materials may also be used to provide similarities to the apparatuses for events or sporting contests, for example, a foam, a rubber, a soft polymer, a cloth material (e.g., denim, silk), or other materials known to persons of ordinary skill and not likely to cause injury when being tossed from one person to another. In yet a further embodiment, a soft cover (not shown) made from softer materials may also be provided for the device housing 300, to limit injury during tossing of the device 100 during use, should the recipient of the toss not catch the device 100 correctly.

Figure 2:
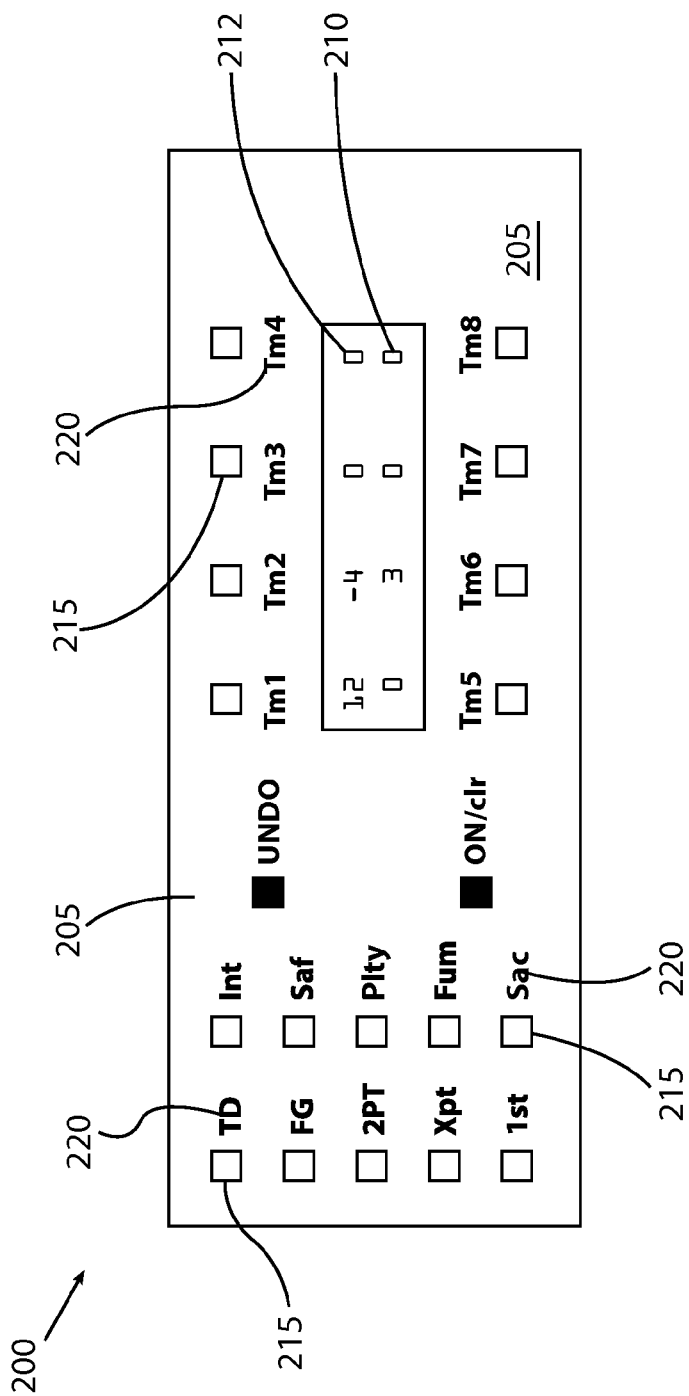
FIG. 2 illustrates a schematic front view of the controller for the electronic handheld device according to an embodiment of the present invention.

FIG. 2 illustrates a schematic front view of the controller 200 for the device 100 according to an embodiment of the present invention.

The controller 200, in general, may include a control panel 205, one or more controls 215, one or more labels 220 corresponding to a particular event or sporting contest, and at least one display 210. In the embodiment shown in FIG. 2, the control panel 205 includes a plurality of controls 215 and labels 220 corresponding to a football sporting contest, and one display 210. The control panel 205 may define one or more openings corresponding to the controls 215 and the display 210. The control panel 205 may be constructed from a polymeric material, wood material, paper-based material, metallic material, ceramic material, combinations thereof or any material known to a person of ordinary skill in the art, and capable of providing an opening to accommodate the controls 215 and display 210.

The controls 215 and display 210 are operatively connected to a circuit board 400 (FIG. 4) for receiving commands, processing code and data, and displaying information pertaining to the sporting contest. Controls 215 may be touch sensitive, i.e., responsive to a players touch, and include buttons, knobs, keypads, or a touch screen.

One set of the controls 215 may correspond to scoring events related to the sporting contest, while another set of the controls 215 may correspond to system controls, which may be common between all sporting contests, or electric handheld devices. An example of a common control is an on/off button, a clear button, or an undo button for erasing recently entered information, or any information needing to be corrected or deleted. In the embodiment shown in FIG. 2, the plurality of controls 215 and labels 220 correspond to a football game. In this embodiment, the plurality of controls 215 and labels 220 include a touchdown control (TD), a field goal control (FG), a two-point conversion control (2pt), an extra point control (Xpt), a first down control (1st), an interception control (Int), a safety control (Saf), a penalty control (Pity), a fumble control (Fum), and a sack control (Sac). Additional controls shown in the embodiment of FIG. 2 include an undo control (UNDO) and a power control (ON/clr). It should be appreciated that while the labels 220 depicted in the figures appear to be in a particular order or pertaining to a particular sporting contest, the depiction is for exemplary purposes only, and is not intended to be limiting as the labels and configuration of the same may be reconfigured based on the sporting contest or other design or aesthetic criteria.

In the embodiment shown, the power control may have dual functions, i.e., may be configured to perform multiple commands. For example, once the power control has been depressed to turn on the device, the power control may then be used for clearing information entered into the device, or for resetting and beginning a new game. In yet a further example, the TD, Xpt and 2pt controls may also be combined into a single control, such that the TD control becomes the Xpt control or 2pt control after a TD scoring event occurs and the TD control is selected. Such a combination makes logical sense in that during a football game, an extra point or two point conversion attempt occurs only after a touchdown is scored. The player may select the TD control for the TD scoring event, and either select the same control once for a Xpt, or twice for a 2pt. Further illustrated in the embodiment shown in FIG. 2, an additional set of controls 215 and labels 220 are provide for indicating the number of participants e.g., individuals or teams, using the device 100. While the controller 200 in FIG. 2 shows eight participant controls (Teams 1 through 8), any number of participant controls may be included. For example, the device illustrated in FIG. 1 shows controls 215 for ten participants. While the controls 215 and labels 220 are illustrated in a particular order in the embodiment of FIG. 2, it will be appreciated that the controls 215 and labels 220 may be arranged in any order desired during configuration.

With continued reference to FIGS. 1 and 2, the labels 220 may be adhered to control panel 205 via an adhesive material. The labels 220 may be permanently or temporarily secured to control panel 205. The labels 220 may also be printed (e.g., screen print) or etched into control panel 205 using an etcher or any means known for printing, engraving or etching information into the materials used for constructing the control panel 205. The control panel 205 may optionally include a protective shield (not shown), constructed from a material similar to control panel 205 material (e.g., glass or plastic material) for protecting the labels 220 or control panel 205 from potential damage (e.g., scratching or cracking) during use, packaging or shipping. In an embodiment where a protective shield is present, the shield may include one or more apertures corresponding to the openings in control panel 205. The labels 220 may also be etched into the protective shield in lieu of the control panel 205. In the example shown, the controller 200 includes a plurality of touch sensitive controls 215. Each control is a button capable of being depressed and returning to its initial position. In one embodiment, the buttons may be biased outwardly by a spring such that the player must overcome the spring force to depress the button and transmit a command. To avoid inadvertent commands being issued when passing the device, a spring having a relatively high spring force may be selected.

The display 210 may be liquid crystal display (LCD), light-emitting display (LED) or any display known to a person of ordinary skill in the art, and capable of visually outputting information to users of the device 100. The display may be operatively connected to the same circuitry connected to the controls 215, or a separate circuitry dedicated to outputting information received from the participants. The second circuitry may be located on a separate second circuit board 450 (FIG. 4) selectively secured and operatively connected to the first circuit board 400.

Figure 3A:
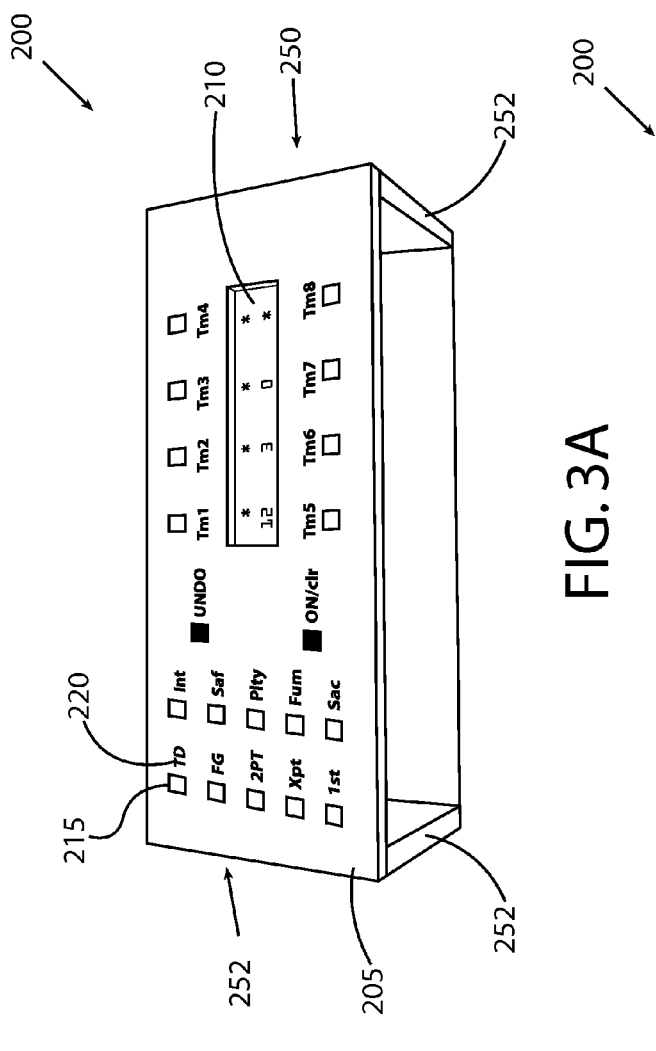
FIG. 3A illustrates a perspective view of the controller of FIG. 2 in a controller housing according to an embodiment of the present invention.
Figure 3B:
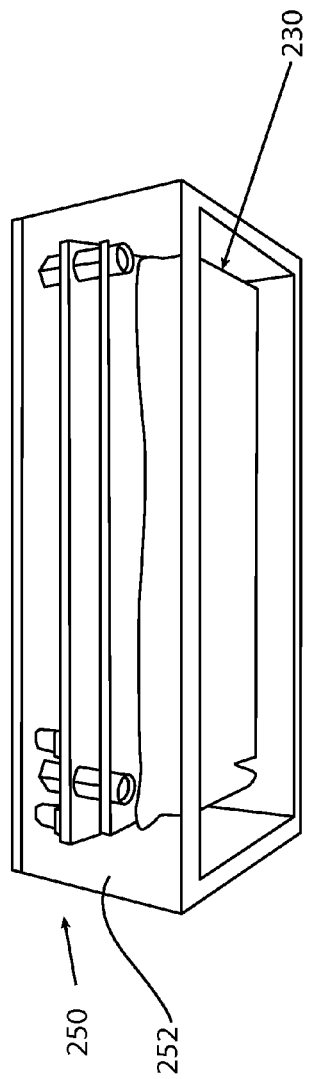
FIG. 3B illustrates a perspective view of the underside of the controller housing of FIG. 3A according to an embodiment of the present invention.

In the embodiment shown in FIGS. 1, 2, and now FIG. 3, the characters 212 displayed in the display 210 are aligned with the controls 215 and labels 220 for the participants. While this configuration is illustrated in the figures, the display 210 may include other indicators for identifying which score or information corresponds to a particular participant. For example, the display may simply indicate a team name or number and its score. In lieu of indicating an actual score, the display 210 may show images representing the score. For example, bars may represent a team's score, specific images may also have a particular value that is indicative of the score received for a scoring event. However, for exemplary purposes, the figures illustrate the use of numbers for indicating the score for a particular team. Additionally, the display 210 may include information not related to a particular team or scoring event. For example, the display 210 may illustrate the elapsed playing time of the broadcasted sporting contest, or the time remaining via a clock operatively connected to the display 210. The clock may be actuated by any one of the controls 215, or by a combination of controls 215 systematically programmed to begin the clock functionality. Additionally, other statistics may be displayed to the user via the display 210, like total yards for a particular team, or player updates.

Figure 6:
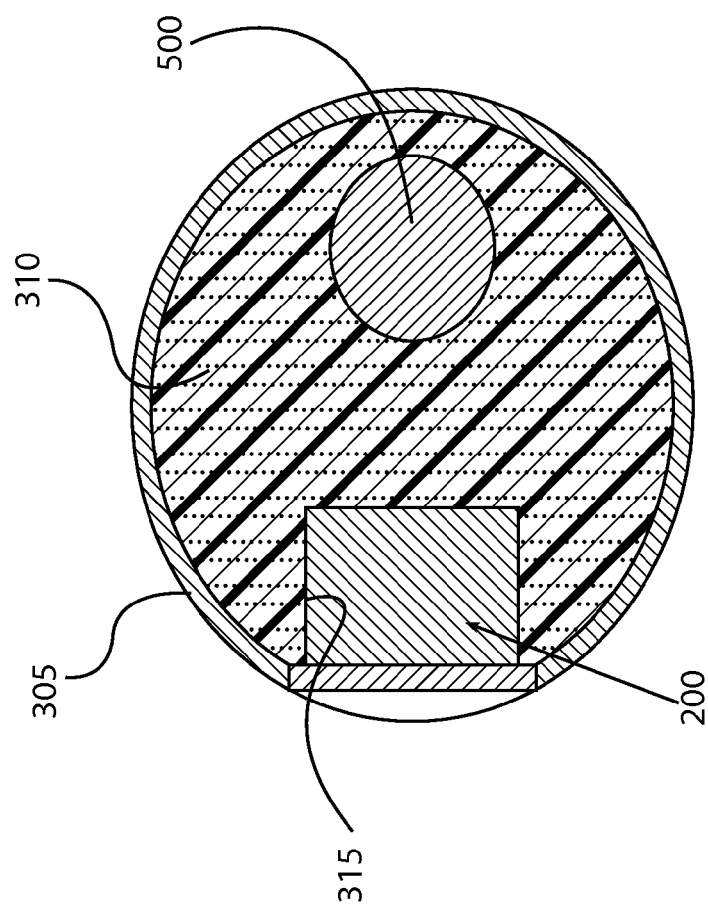
FIG. 6 illustrates a cross-sectional view as might be seen along line 6-6 of FIG. 1.

With continued reference to FIG. 3, controller 200 may include a frame 250 having an opening formed between a plurality of side walls 252 for receiving the controller 200 therein. The frame 250 may be constructed from materials similar or identical to the materials of the control panel 205. The frame 250 may be configured such that it is adapted to be received within the device housing 300, without altering the shape of the device housing 300. The frame 250 may be frictionally fitted into an opening 315 (FIG. 6) in the device housing 300, or secured using fasteners (not shown). Fasteners may include hook and loop fasteners, stitching, screws, threaded bosses, or means for fastening known to person of ordinary skill in the art and capable of holding the frame 250 or controller 200 in place so that the same is removably or permanently secured in the device housing 300. In the embodiment shown in FIG. 3, the controller 200 is positioned relative to the upper portion of the frame 250. In this embodiment, control panel 205 overlies the outer portion of frame 250.

In a further embodiment, the edges of the control panel 205 may extend beyond the boundaries of the frame 250. For example, two opposed ends of the control panel 205 may extend over two opposed side walls 252, such that the underside of the two opposed ends and the surface of the two opposed side walls 252 form an angle. In yet a further embodiment, the control panel 205 and the frame 250 are integral. In embodiments where a protective shield is desired, the protective shield and the frame 250 may be integral. In yet a further embodiment, the frame 250 may have a generally ovate shape corresponding to the shape of the device housing 300.

A power source 230 (FIG. 3B) may be operatively connected to controller 200. The power source 230 may be a battery, or other portable source of power known to a person of ordinary skill in the art. The power source may be recharged by connecting the device to an external power supply or from energy generated through external sources including kinetic energy created during movement of the device or solar energy. In one embodiment, the power control 215 (on/clr) is operatively connected to the power source 230 such that when the power control 215 is selected, the device 100 is powered on, or if desired powered off. Additionally, movement of the device 100 may be sufficient to power on the device 100 where a motion detection sensor is operatively connected to the power source 230.

Additionally, the power source 230 may be selectively secured to or within frame 250 and adjacent to the controller 200, such that removal of the controller 200 or frame 250 provides access to the power source 230. The power source 230 may also be selectively secured to the controller 200. In yet a further embodiment, the power source 230 may be located within the device housing 300 separate from the controller 200 and frame 250. For example, as shown in FIG. 1, the power source 230 is located at one end of the device 100 and connected to controller 200 by wires 232. This configuration may be more practical when in embodiments where controller 200 or frame 250 are permanently secured within the device 100. Additionally, in an embodiment where power source 230 is positioned apart from the controller 200 or frame 250, the power source 230 may be secured within a power source housing 235 (FIG. 1).

In a further embodiment, the device 100 may include a ballast 500 (FIG. 1) for providing stability or balance to the device 100 while the device 100 is being tossed between participants. For example, as discussed herein, when playing a game with the device 100, the device 100 is tossed back and forth between players during a viewed sporting event. To facilitate operation of the controller 200 and viewing of the display, these components may be located on one side of the device and may create an imbalance if their weight is greater than the housing or cushioning material on the opposite side of the device. Ballast 500 is provided within the housing to balance the device 100. For example, ballast 500 may be placed opposite from the display and controller to offset the weight of these components. The ballast 500 may be constructed from the same or similar materials used for the device housing 300, or any other material capable known to persons of ordinary skill in the art for providing weight and capable of providing balance or stability. In yet a further embodiment, the power source 230 may be used as the ballast 500, thereby providing balance for the device 100.

Figure 4:
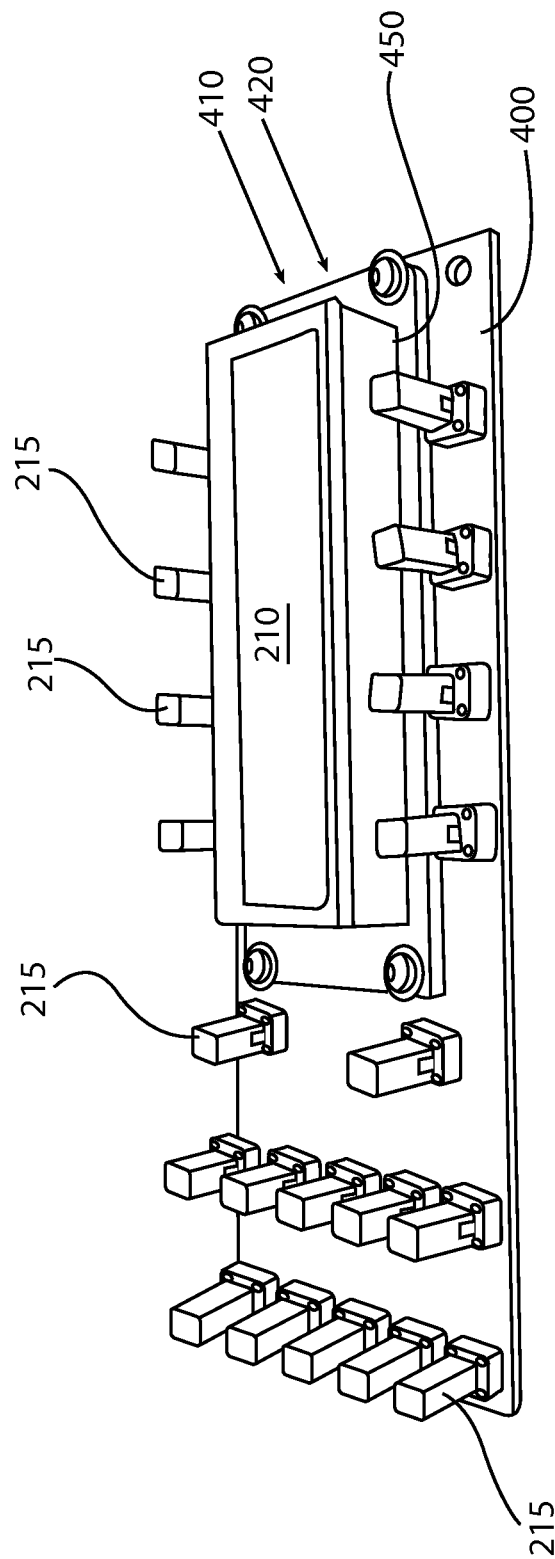
FIG. 4 illustrates a schematic perspective view of a circuit board according to an embodiment of the present invention.

With continue reference to FIGS. 1-3, and now FIG. 4, a schematic perspective view of a circuit board 400 according to an embodiment of the present invention is provided. As previously discussed, the controller 200 includes a circuit board 400 for processing commands received from one or more of the controls 215. The circuit board 400 may be a printed circuit board (PCB) with one or more components configured to perform the processes for the device 100. The components include at least one microprocessor 410 operatively connected to the controls 215, a memory means 420 configured to store information or data corresponding to the sporting contest, the clock, the display 210, and the power source 230, for selectively controlling the same.

In operation, the microprocessor 410 receives one or more commands from the controls 215, and processes the data from the memory means 420, corresponding to the one or more commands. For example, during a live football game, when a participant depresses the TD control, the microprocessor 410 gathers the information from the memory means 420, which may be a simple database, corresponding to the TD control, and displays the value of this information on the display for the particular participant. In this example, a TD in a football game is valued at six (6) points. When the participant (Team 1) selects the TD control, 6 points are displayed on the display 210 for that participant. At this time, as previously discussed, the microprocessor 410 may switch the value of the TD control to a different value, either 1 or 2, depending on whether an extra point or two point conversion is attempted during the football broadcast, or in the alternative, Team 1, in a game where Team 1 maintains possession of the device 100, may simply select the Xpt control, at which time, the microprocessor 410 gathers the information for an extra point, and adds the TD value with the extra point value to Team 1 total, which is displayed on the display 210. In yet a further embodiment, if a penalty occurs prior to the extra point attempt, Team 1 may select the penalty control. The microprocessor 410 then knows, through programming code, to subtract the value of a penalty received from the memory means 420 from Team 1's score, and displaying the current value after the subtraction on the display 210. Other calculations by the microprocessor 410 may be formed, e.g., multiplication or division, dependent upon the scoring algorithm of the sporting contest. Additionally, should a scoring event be reversed during the broadcasted sporting contest, Team 1 may select the undo control, at which time, the microprocessor 410 reverses the previous calculations displayed on the display 210, and returns Team 1's score to the previous amount. It should further be appreciated that the point values (e.g., 6 points for a TD) discussed herein are for exemplary purposes, and that any point value may be assigned to any scoring event.

In yet a further embodiment, a method for playing a game using the device 100 is provided. The examples illustrated in this method are particular to a football game, and should not be considered limiting. However, it should be appreciated that other sporting contests and interactive games could be the subject of the present invention. For example, the device 100 may be shaped like a baseball or softball corresponding to a baseball or softball event. In this embodiment, the device housing 300 is preferably made from a material similar to the materials for constructing a baseball or softball, and may have similar dimensions such that the participants feel as if they are part of the sporting contest being broadcasted. Additionally, the scoring system would be indicative of the scoring system of a baseball game. For example, controls would be present for singles, doubles, triples and homeruns. Controls would further include strikes, balls, errors etc. However, for exemplary purposes the method described herein will be indicative of the embodiment illustrated in the figures.

To begin the game, the device 100 is powered on using the power control, or by tossing the device 100 around (in an embodiment where a motion sensor is tied to the power source 230). During a broadcasted sporting event watched by the participating players, the device 100 is in the possession of the first participant, whose team may be represented on the display 210 as Team 1, for a predetermined period of time. The predetermined period of time may be set by any player at any time during play, or be based on a period of time determined by the broadcasted event. For example, where the event is a football game, the predetermined time may be base on a single play, between consecutive snaps, the time between a change of possession, or the time of possession.

During the broadcasted sporting contest, and while the device is in the possession of Team 1, a kick off is received by the receiving team in the broadcasted sporting contest. During the runback, if no points are scored, via a safety or touchdown, no scoring event occurs warranting Team 1 to select one of the controls 215 for a scoring event. Because no scoring event has occurred, Team 1 passes or tosses (like a football pass) the device 100 to the next participant who may be represented as Team 2. While Team 2 is in possession of the device 100, the team having the ball during the broadcasted sporting contest runs a play, obtains a total of 10 yards, and is awarded a first down. As a result, Team 2 depresses the 1st control representing a first down, and is awarded 1 point. At this time, the microprocessor 410 receives the command from the 1st control, and the display 210 displays a score of 1 point for Team 2. At this time, after the first down is awarded, Team 2 either passes the device 100 back to Team 1, if there are only two participants, or tosses the device 100 to a third participant represented as Team 3. The device 100 knows which team has the ball either by the team selecting the control corresponding to the team number, or by the tossing motion, at which time a motion sensor switches to the next team in order, preferably a logical order. At this time, during the broadcasted sporting contest, with Team 3 having possession of the device 100, the offensive team throws an interception, Team 3 would then depress the Int control representing an interception, and the microprocessor 410 would deduct 2 points from Team 3's score. However, in this example, the play continues and concludes only after intercepting team returns the ball during the broadcasted contest for a touchdown. At this time, while one scoring event occurred (i.e., the interception), because the broadcasted play did not conclude until after the second scoring event (i.e., the touchdown), Team 3 is also awarded 6 points after selecting the TD control, thus Team 3 receives 4 points (TD minus Int) for the current play. Alternatively, the microprocessor may also be programmed to only award the points for the final scoring event. Using the above example, Team 3 would receive 6 points for the touchdown, and the interception would not influence Team 3's score unless the touchdown did not occur. The game continues by passing the device 100 between the teams, with each team selecting one of the controls 215 corresponding to an event occurring during the broadcasted sporting contest. The game concludes at the end of the broadcasted sporting contest, with the winner being the team that accumulated the most points or any other agreed upon means for determining a winner (e.g., team with most TDs or lowest points). In a contest where the most points determines the winner, the high score may be displayed on the display 210 with a distinct indicator, like a blinking star, or simply flashes under the label/name of the winning team. The game may also end by hitting the reset control for a predetermined amount of time, which would clear all scores.

Optionally, should the device 100 be tossed and a control 215 (e.g., the reset control) be depressed unintentionally, the scoring event may not clear immediately, but instead only clear after a predetermined amount of time (e.g., 5 seconds). The predetermined amount of time will generally be more time than what is needed for depressing and releasing or generally selecting the control 215. In yet a further embodiment, a disable control 215 may be used to disable the functionality of the other controls. In operation, for example, prior to one player tossing the device 100 to another player, the tossing player selects the disable control 215 and then tosses the device 210. When the device is caught by the next player, should the receiving player accidently hit another control 215, this inadvertent act of hitting the control 215 would not register a command. Instead, the receiving player would select the disable control 215 again, thereby reactivating the other controls 215 so that commands may now be transmitted.

Also, a cursor (not shown) may be present on the display 210 to indicate that the control 215 was depressed. The cursor may blink or include a timer to count down the time before the depressed control 215 will register a command to the microprocessor 410. Additionally, in a situation where there are a small number of participants, e.g., two players, each player may hold onto the device 100 until a change of possession by the teams playing in the broadcasted sporting contest. The sporting contest may be in audible, televised, live or broadcasted at a later time (e.g., delayed or previously recorded).

With continued reference to FIG. 1, and in a further embodiment, the device 100 may include a vent 600 to allow heat generated by the electronics to escape from the device 100 or to supply cooling air to the electronics. The vent 600 may be any opening in the device 100, including slots (FIG. 1) that simulate the laces on a football as shown. Vent 600 may be covered by an air permeable material, such as, a cloth material, a mesh material, or any other material known to persons of ordinary skill in the art to prevent objects from entering the device yet allow air to flow through the device 100. In the embodiment shown in FIG. 1, the vent 600 is positioned above the controller 200, however, the vent 600 may be positioned anywhere in the device housing 300 to allow for air to circulate through the device 100.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. An electronic sporting device that is passed between participating players while watching a sporting event, the device comprising:

a controller including at least a first circuit board and a first microprocessor;

a plurality of touch sensitive controls of the first circuit board operable by the players to transmit a command related to the sporting event;

a first microprocessor of said controller in communication with said first circuit board and operatively connected to said plurality of touch sensitive controls;

a memory of said controller for receiving and processing said command, wherein said microprocessor is configured to transmit a dataset from said memory representative of said command;

at least one control measure that resists accidental actuation of said plurality of touch sensitive controls;

a display operatively connected to said first circuit board for displaying said transmitted dataset;

a power source operatively connected to said microprocessor and said first circuit board;

a timer that tracks one or more predetermined times associated with possession of the electronic sporting device by one or more of the players; and a motion detection sensor that detects motion of the electronic sporting device, the electronic sporting device is at least one of energized and sets at least one of the one or more predetermined times based at least in part on the motion; and a cushioned device housing having an outer surface that defines a shape that facilitates passing of the device between the players, wherein said controller, display, and power source are mounted within said device housing, and wherein the display is located near an outer surface of said device housing and an opening is formed within the device housing to permit viewing of said display.

2. The electronic sporting device of claim 1, wherein said outer surface of said device housing is made from a material selected from the group consisting of a leather, foam, rubber, polymer, fabric, and synthetic material.

3. The electronic sporting device of claim 1, further comprising a control panel, wherein said display and said control are located on said control panel, said control panel being received within said opening formed in said outer surface of said device housing.

4. The electronic sporting device of claim 1 further comprising a ballast positioned within said housing to balance a weight of said controller and said display.

5. The electronic sporting device of claim 1, wherein said shape is a football shape.

6. The electronic sporting device of claim 1, further comprising a plurality of springs of the at least one control measure that resists accidental actuation of the plurality of touch sensitive controls, wherein the plurality of springs are associated with one of more of the plurality of touch sensitive controls, and wherein the plurality of springs have a spring coefficient that resists accidental depression of the one or more of the plurality of touch sensitive controls.

7. The electronic sporting device of claim 1, further comprising a protective shield of the at least one control measure that resists accidental actuation of the plurality of touch sensitive controls, wherein the protective shield covers one or more of the plurality of touch sensitive controls.

8. The electronic sporting device of claim 1, further comprising a control timer of the at least one control measure that resists accidental actuation of the plurality of touch sensitive controls, wherein the control timer delays processing of said command until one or more of the plurality of touch sensitive controls is actuated for a timer period.

9. The electronic sporting device of claim 1, wherein one of said plurality of touch sensitive controls is a scoring control.

10. The electronic sporting device of claim 9, wherein said scoring control is selected from the group consisting of a touchdown, an extra point, a first down, a field goal, a 2pt conversion, a safety, an interception, a fumble, a penalty, and a sack.

11. The electronic sporting device of claim 9, wherein said microprocessor processing said command corresponding to said scoring control returns a positive dataset value to be added to a player score associated with a player in control of the electronic sporting device among the participating players.

12. The electronic sporting device of claim 9, wherein said microprocessor processing said command corresponding to said scoring control returns a negative dataset value to be deducted from a player score associated with a player in control of the electronic sporting device among the participating players.

13. An electronic sporting device for passing between participating players while watching a sporting event comprising:
a device housing having an outer surface made from a material selected from the group consisting of a foam, rubber, polymer, fabric, leather and synthetic material, and having a void configured to frictionally receive a frame therein;
a frame selectively secured within said void of said device housing; said frame having an upper and lower portion, and a first opening for receiving a controller therein;
a controller secured to said upper portion of said frame; said controller having a control panel with a plurality of apertures adapted to receive at least one control therebetween, a first circuit board having the at least one control selectively secured thereon, a first microprocessor selectively secured to said first circuit board and operatively connected to a plurality of controls and a memory for receiving and processing a command, and transmitting a dataset from said memory representative of said command;
a display selectively secured to said first circuit board and adapted to display a calculated score based upon said transmitted dataset;
a power source selectively secured within said lower portion of said frame, said power source operatively connected to said microprocessor and said first circuit board for providing power to the electronic sporting device;
a timer that tracks one or more predetermined times associated with possession of the electronic sporting device by one or more of the players; and
a motion detection sensor that detects motion of the electronic sporting device, the electronic sporting device is at least one of energized and sets at least one of the one or more predetermined times based at least in part on the motion;
wherein a first actuation of the at least one control transmits a first command related to a sporting contest, and a subsequent actuation of the at least one control transmits a second command related to the sporting contest based at least in part on the earlier first actuation.

14. A method for playing a game between a plurality of players using an electronic sporting device in conjunction with a sporting event viewed by the players, the method comprising the steps of:
(a) providing an electronic sporting device having a controller having at least one control operable by the players during the sporting event;
(b) detecting a first motion of the electronic sporting device to energize the electronic sporting device;
(c) each player holding the sporting device for a predetermined time and selecting at least one control if a scoring event occurs in the sporting event during said predetermined time;
(d) said controller recording a point value associated with operation of said at least one control in a memory within the sporting device and calculating a score for each player;
(e) storing said score for each player in said memory and displaying said score on a display within said sporting device;
(f) tossing said electronic sporting device to another participant after said predetermined time;
(g) detecting a tossing motion to identify the other participant; and
(h) repeating steps (c) through (g) until said game is concluded.

15. The method of claim 14, wherein the scoring event is selected from the group consisting of a touchdown, a field goal, a two point conversion, an extra point, a first down, an interception, a safety, a penalty, a fumble and a sack.

16. The method of claim 14, wherein said game is concluded at the end of said sporting event.

17. The method of claim 14, wherein the predetermined time is one of the time between the beginning of a sports play and the end of a sports play, a period of time between stoppages in play, an amount of time on a game clock, and an arbitrary length of time not related to a game clock.

* * * * *